US009699853B2

(12) United States Patent
Zhang et al.

(10) Patent No.: US 9,699,853 B2
(45) Date of Patent: Jul. 4, 2017

(54) METHOD AND APPARATUS FOR DIMMABLE LED DRIVER

(71) Applicant: Marvell World Trade Ltd., St. Michael (BB)

(72) Inventors: Wanfeng Zhang, Palo Alto, CA (US); Daniel Reed, Sunnyvale, CA (US); Jinho Choi, Saratoga, CA (US); Pantas Sutardja, Los Gatos, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/335,691

(22) Filed: Oct. 27, 2016

(65) Prior Publication Data

US 2017/0048943 A1    Feb. 16, 2017

Related U.S. Application Data

(63) Continuation of application No. 14/247,556, filed on Apr. 8, 2014, now Pat. No. 9,485,816.

(60) Provisional application No. 61/819,239, filed on May 3, 2013.

(51) Int. Cl.
*H05B 33/08* (2006.01)
*H05B 37/02* (2006.01)

(52) U.S. Cl.
CPC ..... *H05B 33/0845* (2013.01); *H05B 33/0815* (2013.01); *H05B 37/0263* (2013.01); *Y02B 20/346* (2013.01)

(58) Field of Classification Search
None
See application file for complete search history.

(56) References Cited

U.S. PATENT DOCUMENTS

| 5,519,289 | A | 5/1996 | Katyl | |
| 6,774,579 | B2* | 8/2004 | Abe | H05B 41/2858 |
| | | | | 315/209 CD |
| 6,975,525 | B2 | 12/2005 | Kernahan | |
| 7,471,051 | B1 | 12/2008 | Wacknov | |
| 8,384,295 | B2 | 2/2013 | Simi | |
| 8,653,757 | B2* | 2/2014 | Daniel | H05B 33/0815 |
| | | | | 315/112 |
| 8,829,819 | B1 | 9/2014 | Angeles | |
| 8,937,435 | B1* | 1/2015 | Sutardja | H05B 33/0815 |
| | | | | 315/219 |
| 2004/0095020 | A1 | 5/2004 | Kernahan | |

(Continued)

FOREIGN PATENT DOCUMENTS

WO    WO 2011/051859 A1    5/2011

OTHER PUBLICATIONS

Internationai Search Report and Written Opinion issued Sep. 10, 2014 in PCT/US2014/033308.

*Primary Examiner* — Crystal L Hammond

(57) ABSTRACT

Aspects of the disclosure provide a method for driving dimmable load. The method includes detecting a dimming characteristic in an energy source from which a load draws a first energy according to the dimming characteristic. The dimming characteristic requires a second energy in addition to the first energy to be drawn from the energy source to sustain an operation of the energy source. The method further includes biasing a switch to consume the second energy. The second energy and the first energy are drawn from the energy source to sustain the operation of the energy source.

20 Claims, 3 Drawing Sheets

(56) References Cited

U.S. PATENT DOCUMENTS

| | | |
|---|---|---|
| 2004/0095081 A1 | 5/2004 | Kernahan |
| 2007/0182338 A1 | 8/2007 | Shteynberg |
| 2009/0066157 A1 | 3/2009 | Tarng |
| 2010/0231136 A1 | 9/2010 | Reisenauer |
| 2010/0259185 A1 | 10/2010 | Sadwick et al. |
| 2010/0259196 A1 | 10/2010 | Sadwick et al. |
| 2011/0043133 A1 | 2/2011 | Van Laanen |
| 2011/0080110 A1 | 4/2011 | Nuhfer |
| 2011/0080111 A1 | 4/2011 | Nuhfer |
| 2011/0080118 A1* | 4/2011 | Daniel ............... H05B 33/0815 315/297 |
| 2011/0084622 A1 | 4/2011 | Barrow |
| 2012/0025733 A1 | 2/2012 | Melanson |
| 2012/0081009 A1* | 4/2012 | Shteynberg .......... H05B 33/083 315/122 |
| 2012/0126713 A1 | 5/2012 | Horino |
| 2012/0274216 A1 | 11/2012 | Datta |
| 2012/0319621 A1 | 12/2012 | Sutardja et al. |
| 2012/0320646 A1 | 12/2012 | Zhang et al. |
| 2013/0241441 A1 | 9/2013 | Myers |
| 2013/0300311 A1 | 11/2013 | Hsieh |
| 2015/0312987 A1* | 10/2015 | Gibbs ................ H05B 33/0887 315/122 |

* cited by examiner

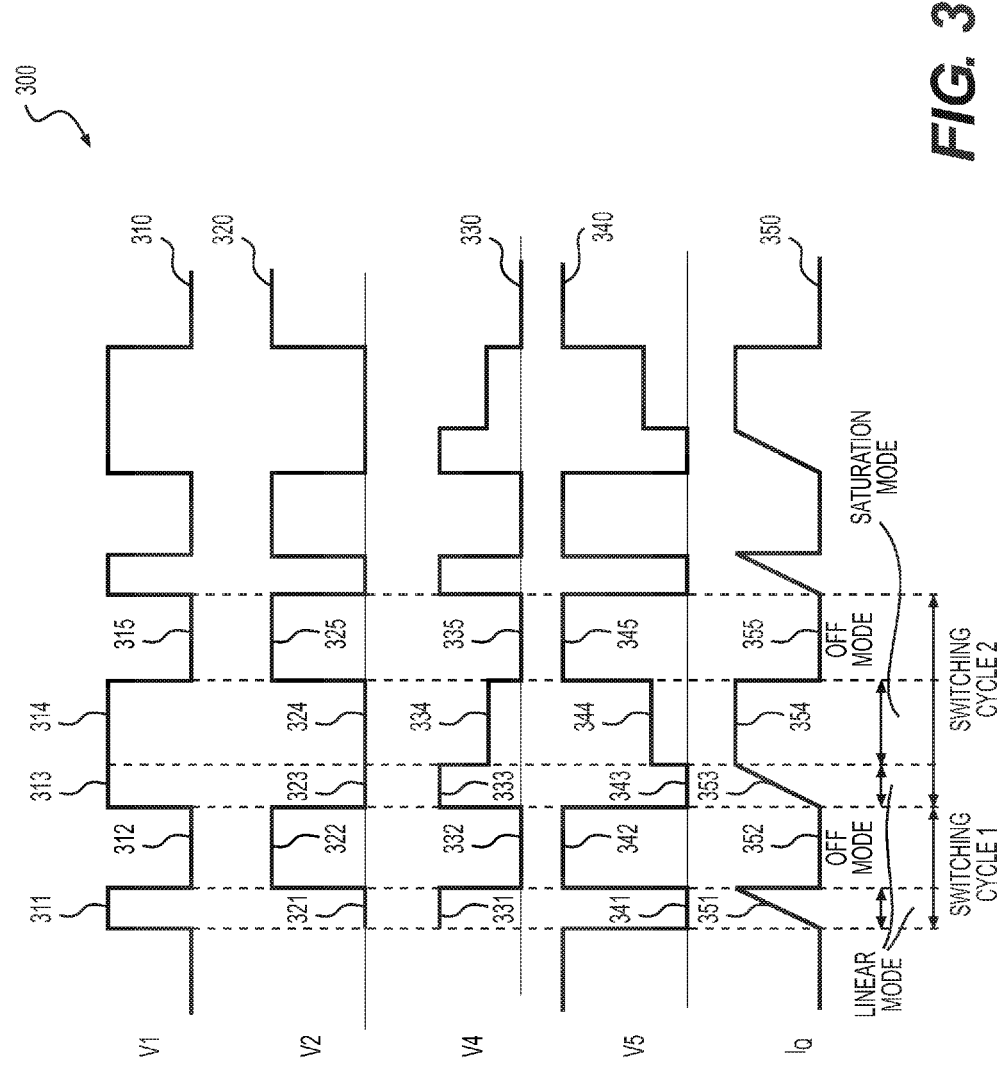

METHOD AND APPARATUS FOR DIMMABLE LED DRIVER

INCORPORATION BY REFERENCE

This application is a continuation of U.S. application Ser. No. 14/247,556, filed Apr. 8, 2014, which claims the benefit of U.S. Provisional Application No. 61/819,239, "CONTROL METHOD AND SILICON IMPLEMENTATION FOR DIMMABLE LED DRIVER" filed on May 3, 2013. The disclosures of the applications referenced above are incorporated herein by reference in their entireties.

BACKGROUND

Light emitting diode (LED) lighting devices provide the advantages of low power consumption and long service life. Thus, LED lighting devices may be used as general lighting equipment to replace, for example, fluorescent lamps, bulbs, halogen lamps, and the like.

SUMMARY

Aspects of the disclosure provide a method for driving dimmable load. The method includes detecting a dimming characteristic in an energy source from which a load draws a first energy according to the dimming characteristic. The dimming characteristic requires a second energy in addition to the first energy to be drawn from the energy source to sustain an operation of the energy source. The method further includes biasing a switch to consume the second energy. The second energy and the first energy are drawn from the energy source to sustain the operation of the energy source.

According to an aspect of the disclosure, the switch is switched on/off to draw the first energy from the energy source. In an embodiment, the switch is implemented using a metal-oxide-semiconductor field-effect transistor (MOSFET). The MOSFET is biased in a saturation mode to consume the second energy. The method further comprises biasing the MOSFET in a linear mode to turn on the MOSFET to store the first energy in a magnetic component in connection with the MOSFET, and biasing the MOSFET in an off mode to turn off the MOSFET to transfer the first energy from the magnetic component to the load.

In an embodiment, the method includes outputting a first voltage for a gate terminal of the MOSFET to bias the MOSFET in the linear mode, detecting a current flowing through the MOSFET, outputting a second voltage for the gate terminal of the MOSFET to bias the MOSFET in the saturation mode in order to consume the second energy when the current reaches a limit and outputting a third voltage for the gate terminal of the MOSFET to turn off the MOSFET.

In an example, the switch is a first switch, and the method further includes switching on the first switch and a second switch to store the first energy in a magnetic component and switching on the first switch and switching off the second switch to charge a capacitor that stores energy for driving an integrated circuit.

Aspects of the disclosure provide a circuit including a control circuit. The control circuit is configured to detect a dimming characteristic in an energy source from which a load draws a first energy according to the dimming characteristic. The dimming characteristic requires a second energy in addition to the first energy to be drawn from the energy source to sustain an operation of the energy source. Further, the control circuit is configured to bias a switch to consume the second energy. The second energy and the first energy are drawn from the energy source to sustain the operation of the energy source.

Aspects of the disclosure provide an apparatus that includes a magnetic component, a switch and an integrated circuit (IC) chip. The magnetic component is for transferring energy from an energy source to a load. The switch is for controlling the magnetic component. The IC chip has a control circuit on the chip. The control circuit is configured to detect a dimming characteristic in the energy source from which the load draws a first energy according to the dimming characteristic. The dimming characteristic requires a second energy in addition to the first energy to be drawn from the energy source to sustain an operation of the energy source. Further, the control circuit is configured to bias the switch to consume the second energy. The second energy and the first energy are drawn from the energy source to sustain the operation of the energy source.

BRIEF DESCRIPTION OF THE DRAWINGS

Various embodiments of this disclosure that are proposed as examples will be described in detail with reference to the following figures, wherein like numerals reference like elements, and wherein:

FIG. 3 shows a plot 300 of waveforms according to an embodiment of the disclosure.

DETAILED DESCRIPTION OF EMBODIMENTS

Figure 1:
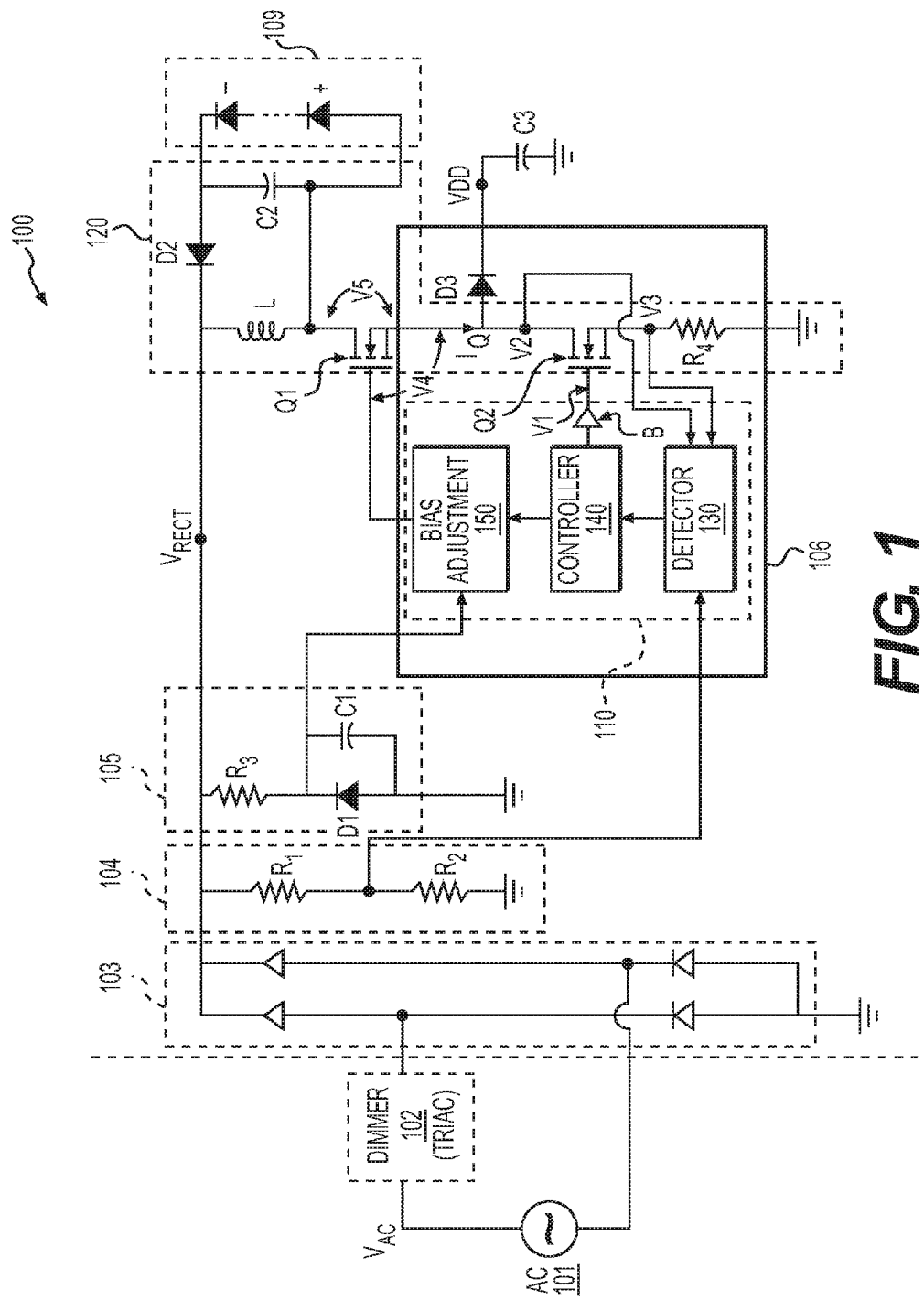
FIG. 1 shows a block diagram of an electronic system 100 according to an embodiment of the disclosure.

FIG. 1 shows a block diagram of an electronic system 100 according to an embodiment of the disclosure. The electronic system 100 operates based on an alternating current (AC) voltage $V_{AC}$ provided by an AC power supply 101 with or without a dimmer 102. The AC power supply 101 can be any suitable AC power supply, such as 60 Hz 110V AC power supply, 50 Hz 220V AC power supply, and the like.

According to an aspect of the disclosure, the electronic system 100 is operable under various dimming characteristics of the power supply. In an example, a power supply may have a pre-installed phase-cut dimmer 102, such as a triode for alternating current (TRIAC) type dimmer having an adjustable dimming angle α. The dimming angle α defines a size of a phase-cut range during which the TRIAC is turned off. Further, a phase range that is out of the phase-cut range can be referred to as a conduction angle during which the TRIAC is turned on. During an AC cycle, when the phase of the AC voltage $V_{AC}$ is in the phase-cut range, the TRIAC is turned off. Thus, an output voltage of the dimmer 102 is about zero. When the phase of the AC voltage $V_{AC}$ is out of the phase-cut range (e.g., in the conduction angle), the TRIAC is turned on. Thus, the output voltage of the dimmer 102 is about the same as the AC voltage $V_{AC}$. The phase-cut dimmer 102 can be a leading edge TRIAC, a trailing edge dimmer, or other types of dimmer.

Generally, the TRIAC type dimmer 102 requires a holding current, such as in a range of 8 to 40 mA, and the like, to sustain the current conduction during the conduction angle. In an example, when a current draw from the TRIAC type dimmer 102 during the conduction angle is lower than the holding current, such as in a deep dimming situation, the TRIAC within the dimmer 102 may be prematurely turned off which may cause flicking and shimmering by a light device for example, and cause unpleasant user experience.

According to an aspect of the disclosure, the electronic system 100 drives a load 109 that is a power efficient device. In an example, the load 109 is a light emitting diode (LED) lighting device, and the power for driving the LED lighting device in the deep dimming situation does not sustain the holding current during the conduction angle. According to the aspect of the disclosure, the electronic system 100 allows an existing circuit component, such as an existing switch, and the like, to consume additional power in the deep dimming situation to sustain the holding current, and thus the TRIAC type dimmer 102 operates properly in the deep dimming situation without being prematurely turned off for example.

In the FIG. 1 example, the electronic system 100 includes a rectifier 103, a control circuit 110, an energy transfer module 120, and a load 109. These elements are coupled together as shown in FIG. 1. Generally, the energy transfer module 120 includes one or more switches, and the control circuit 110 switches on/off the switches to transfer energy from the power supply to the load. According to an aspect of the disclosure, when the power supply is in a deep dimming situation, the control circuit 110 biases at least one of the switches to consume additional power on the switch in order to sustain the holding current for the TRIAC type dimmer 102, and thus the TRIAC type dimmer 102 operates properly in the deep dimming situation without being prematurely turned off for example Specifically, in the FIG. 1 example, the rectifier 103 rectifies an AC voltage to a fixed polarity, such as to be positive. In an example, the rectifier 103 is a bridge rectifier. The bridge rectifier 103 receives the output voltage of the dimmer 102, and rectifies the received voltage to a fixed polarity, such as to be positive. The electronic system 100 may include a capacitor filter (not shown) to remove high frequency noise in the rectified voltage $V_{RECT}$. The rectified voltage $V_{RECT}$ is provided to the following circuits, such as the control circuit 110, the energy transfer module 120, and the like, in the electronic system 100.

The energy transfer module 120 transfers electric energy provided by the rectified voltage $V_{RECT}$ to one or more load devices, such as the load 109 and the like. In an embodiment, the energy transfer module 120 is configured to use a magnetic component, such as a transformer, an inductor, and the like to transfer the electric energy. The energy transfer module 120 can have any suitable topology, such as a fly-back topology, a buck-boost topology, and the like. In the FIG. 1 example, the energy transfer module 120 includes an inductor L, a first switch Q1, a second switch Q2, a current sensing resistor R4, a diode D2 and a capacitor C2. These components are coupled to the power supply (e.g., the rectified voltage $V_{RECT}$) and the load 109 in a buck-boost topology as shown in FIG. 1 to drive the load 109. It is noted that the energy transfer module 120 can be modified to use other suitable topology to transfer the electric energy.

Generally, in the FIG. 1 example, when the first switch Q1 and the second switch Q2 are switched on (e.g., conductive), the inductor L, the first switch Q1, the second switch Q2 and the current sensing resistor R4 form a current path from the power supply to the ground, the power supply charges the inductor L, and the inductor stores electric energy. When the first switch Q1 and the second switch Q2 are switched off (e.g., non-conductive), the electric energy stored in the inductor L is discharged to the load 109 and the capacitor C2. The capacitor C2 stores the electric energy. The electric energy stored in the capacitor C2 can be provided to the load 109 during the time duration when the first switch Q1 and the second switch Q2 are switched on. When the first switch Q1 and the second switch Q2 are switched on/off fast, the inductor L is charged and discharged slightly in each cycle, and a relatively steady voltage to the load 109 can be maintained.

It is noted that the first switch Q1 and the second switch Q2 can be respectively switched on/off for other purpose. In the FIG. 1 example, a portion of the electronic system 100, such as the control circuit 110, the second switch Q2, the current sensing resistor R4, and the like is integrated on an integrated circuit (IC) chip 106. Generally, the IC chip 106 operates under a DC voltage supply VDD. In the electronic system 100, a diode D3 and a capacitor C3 are coupled with the energy transfer module 120 as shown in FIG. 1 to form a voltage supply circuit. In an example, when the second switch Q2 is switched off and the first switch Q1 is switched on, the diode D3 can be forward biased, and the capacitor C3 is charged via the inductor L, the first switch Q1, and the forward biased diode D3 to store electric energy. The stored electric energy on the capacitor C3 can be provided to the IC chip 106 in the form of the DC voltage supply VDD.

It is noted that when the second switch Q2 is switched on, the diode D3 is reverse biased to avoid discharging energy stored on the capacitor C3. In an example, when the first switch Q1 and the second switch Q2 are suitably controlled, the DC supply voltage VDD can be maintained relatively stable.

According to an embodiment of the disclosure, the first switch Q1 is able to be controlled to consume relatively large power. In the FIG. 1 example, the first switch Q1 is a metal-oxide-semiconductor field-effect transistor (MOSFET), such as an N-type MOSFET. In an example, when an MOSFET is biased in a saturation mode, the MOSFET has a relatively large voltage drop over the drain terminal and the source terminal (e.g., $V5$), and the MOSFET flows a relatively large current from the drain terminal to the source terminal (e.g., $I_Q$). Thus, in the saturation mode, the MOSFET itself consumes a relatively large power (e.g., $V5 \times I_Q$). In an example, the MOSFET converts the electric energy into thermal energy.

According to an aspect of the disclosure, the first switch Q1 can be biased into three operation modes—an off mode, a linear mode and a saturation mode. For example, when the gate voltage of the N-type MOSFET is low, such as about the ground level, the N-type MOSFET is turned off and does not conduct current, thus the N-type MOSFET is biased in the off mode. When the gate voltage of the N-type MOSFET is relatively high, such as about the same level as the rectified voltage $V_{RECT}$, the gate voltage is larger than the drain voltage and the source voltage of the N-type MOSFET by at least a threshold voltage of the N-type MOSFET due to a voltage drop on the inductor L, the N-type MOSFET is turned on with a relatively small source-drain voltage, and the N-type MOSFET is biased in the linear mode. When the gate voltage of the N-type MOSFET is between the drain voltage and the source voltage of the N-type MOSFET, the N-type MOSFET is turned on with a relatively large source-drain voltage, and the N-type MOSFET is biased in the saturation mode.

The control circuit 110 detects various parameters in the electronic system 100 and dynamically adjusts control signals based on the detected parameters to control the operations of the first switch Q1 and the second switch Q2, and thus the control circuit 110 controls the operations of energy transfer module 120 to transfer the electric energy to the load 109.

In an example, when the dimming angle is zero, for example when the dimmer 102 does not exist, the control circuit 110 uses a constant turn-on time algorithm to generate pulse width modulation (PWM) signals to control the operations of the first switch Q1 and the second switch Q2. In another example, when the dimming angle is not zero but smaller than a threshold, the dimmer 102 exists but not in the deep dimming situation, the control circuit 110 uses a constant peak current algorithm to generate PWM signals to control the operations of the first switch Q1 and the second switch Q2. In another example, when the dimming angle is larger than the threshold, the dimmer 102 is in the deep dimming situation, the control circuit 110 uses a constant peak current algorithm to generate signals different from the PWM signals to control the operation of the first switch Q1 and the second switch Q2.

Specifically, in the FIG. 1 example, the control circuit 110 includes a detector 130, a controller 140 and a bias adjustment module 150 coupled together as shown in FIG. 1.

The detector 130 is configured to detect various parameters in the electronic system 100, such as the voltage level of the rectified voltage $V_{RECT}$, the drain voltage of the second switch Q2 (V2) and the current flowing through the first switch Q1 ($I_Q$). In the FIG. 1 example, the electronic system 100 includes a voltage divider 104. The voltage divider 104 includes two resistors R1 and R2 coupled in series to provide a fraction of the rectified voltage $V_{RECT}$ to the detector 130 to detect the voltage level of the rectified voltage $V_{RECT}$. In an embodiment, based on the voltage level of the rectified voltage $V_{RECT}$, the detector 130 detects a dimming characteristic, for example a dimming angle, of the dimmer 102. When the dimming angle is larger than a threshold angle, the dimmer 102 is in the deep dimming situation in an example.

Further, in the FIG. 1 example, the current sensing resistor R4 has a relatively small resistance such that a voltage drop (V3) on the current sensing resistor R4 is very small compared to the rectified voltage $V_{RECT}$. The voltage drop V3 is indicative of the current $I_Q$, and is provided to the detector 130 to detect the current $I_Q$.

The controller 140 receives the dimming characteristic, the current $I_Q$ and the voltage V2, and controls operations of the first switch Q1 and the second switch Q2 based on the received information. In the FIG. 1 example, the controller 140 determines operation modes for the first switch Q1 and the second switch Q2. For example, at a time during operation, the controller 140 determines one operation mode out of an off mode, a linear mode and a saturation mode for the first switch Q1 and determines one operation mode out of an off mode and an on mode for the second switch Q2. Based on the operation modes, control voltages to the first switch Q1 and the second switch Q2 are generated. In the FIG. 1 example, the bias adjustment module 150 generates and provides the gate voltage for the first switch Q1 based on the operation mode for the first switch Q1, and a buffer B generates and provides the gate voltage for the second switch Q2 based on the operation mode for the second switch Q2.

In the FIG. 1 example, the bias adjustment module 150 receives a reference bias voltage having a relatively high voltage level, and the operation mode for the first switch Q1, and adjusts the bias voltage to the gate of the first switch Q1 based on the operation mode. In an example, the reference bias voltage is generated based on the rectified voltage $V_{RECT}$ by a bias circuit 105. The bias circuit 105 includes a resistor R3, a diode D1 and a capacitor C1 coupled together as shown in FIG. 1. The capacitor C1 is charged by the rectified voltage $V_{RECT}$, and maintains a relatively stable voltage level, such as about the peak level of the rectified voltage $V_{RECT}$.

In an embodiment, when the operation mode for the first switch Q1 is the off mode, the bias adjustment module 150 outputs a first voltage of a relatively low voltage level, such as about the ground level, as the bias voltage to the gate terminal of the first switch Q1. When the operation mode for the first switch Q1 is the linear mode, the bias adjustment module 150 outputs a second voltage of a relatively high voltage level, such as the reference bias voltage, as the bias voltage to the gate terminal of the first switch Q1 in an example. When the operation mode for the first switch Q1 is the saturation mode, the bias adjustment module 150 outputs a third voltage at an intermediate level between the reference bias voltage and the ground. In an example, the detector 130 detects a source terminal voltage level of the first switch Q1 (V2), and the voltage at the intermediate level is determined based on V2, the threshold voltage of the first switch Q1 and the current $I_Q$ flowing through the first switch Q1.

When the operation mode for the second switch Q2 is the off mode, the buffer B provides a suitable low voltage level to the gate terminal of the second switch Q2 to switch off the second switch Q2, such that the second switch Q2 does not conduct current; and when the determined operation mode for the second switch Q2 is the on mode, the buffer B provides a suitable high voltage level to the gate of the second switch Q2 to turn on the second switch Q2, such that the second switch Q2 conducts current.

In an embodiment, the controller 140 is implemented as software instructions executed by a processor. In another embodiment, the controller 140 is implemented by hardware.

According to an aspect of the disclosure, during operation when the dimmer 102 is in the deep dimming situation, the control circuit 110 uses a constant peak current algorithm to generate signals different from traditional PWM signals to control the operation of the first switch Q1. Traditional PWM signals transit between a high voltage level and a low voltage level with pulse width modulated. In the FIG. 1 example, the control signal to the gate terminal of the first switch Q1 has an intermediate voltage level.

Specifically, in an example, control signals are provided to the gate terminals of the first switch Q1 and the second switch Q2 at a high switching frequency, such as 200 KHz in an example. In each switching cycle, in an example, the control circuit 110 first provides the second voltage to the gate terminal of the first switch Q1 and also turns on the second switch Q2. The current $I_Q$ starts to increase, and electric energy is stored in the inductor L. The control circuit 110 monitors the current $I_Q$, when the current $I_Q$ reaches a predetermined limit, such as when V3 is about 0.4V in an example, the control circuit HO provides the third voltage to the gate terminal of the first switch Q1 and keeps turning on the second switch Q2. The first switch Q1 is in the saturation mode to consume electric energy, and convert the electric energy to thermal energy. In an example, a time duration for the saturation mode is predetermined for the first switch Q1 to consume enough electric energy in order to sustain the holding current of the dimmer 102 in the deep dimming situation. After the predetermined time duration for the saturation mode, the control circuit 110 provides the first voltage to the gate terminal of the first switch Q1 to turn off the first switch Q1, and also turns off the second switch Q2. The stored electric energy in the inductor L is then transferred to the load 109 and the capacitor C2.

Figure 2:
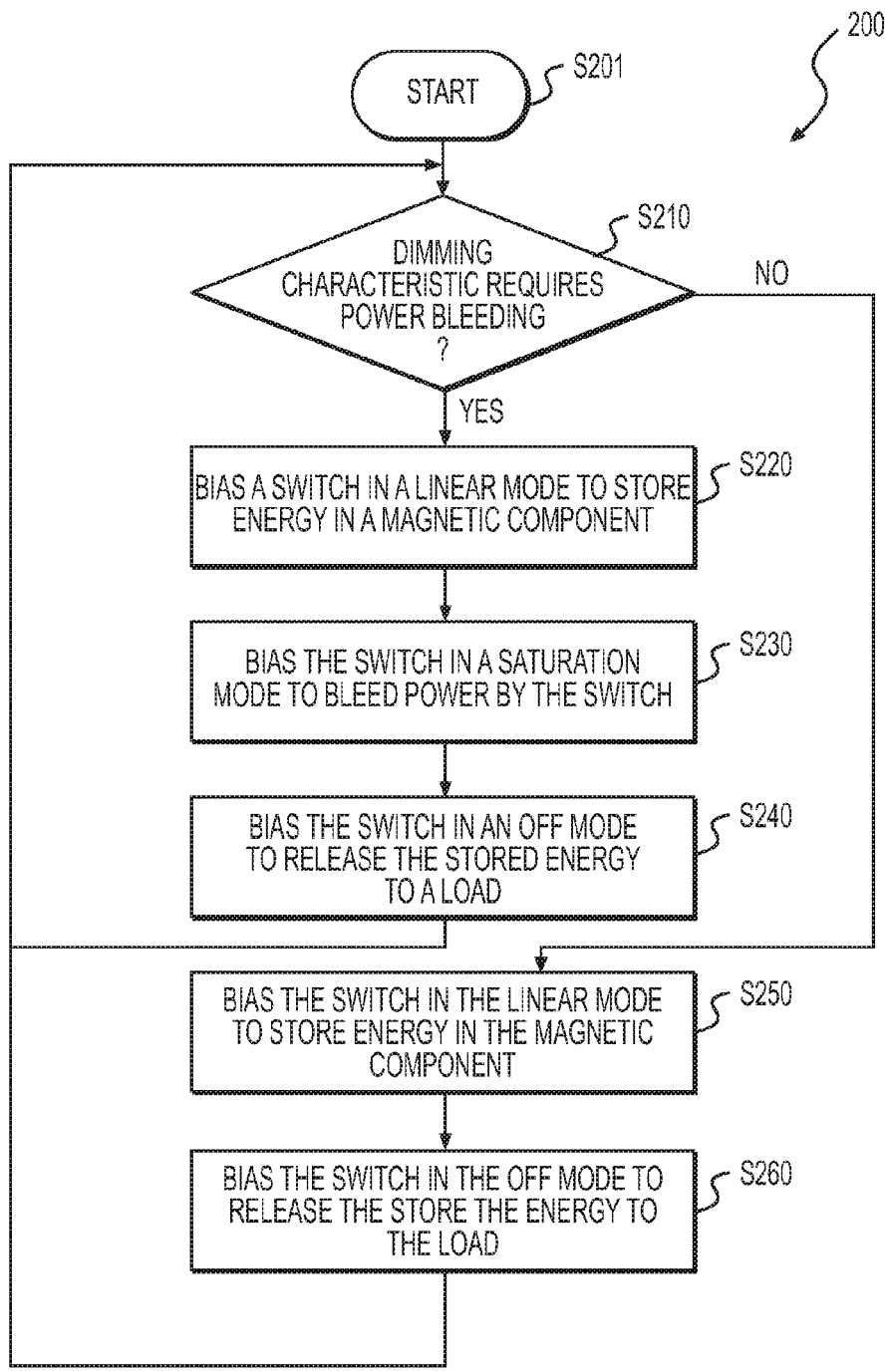
FIG. 2 shows a flow chart outlining a process example 200 according to an embodiment of the disclosure.

FIG. 2 shows a flowchart outlining a process example 200 according to an embodiment of the disclosure. In an example, the process 200 is executed in the electronic system 100, such as by the control circuit 110, and the like. The process starts at S201 and proceeds to S210.

At S210, a dimming characteristic is detected and the process proceeds differently based on the dimming characteristic. In the FIG. 1 example, the detector 130 detects a dimming angle. When the dimming angle is larger than a deep dimming threshold, the dimmer 102 is in the deep dimming situation and the electronic system 100 requires power bleeding in order to ensure proper operation of the dimmer 102, and the process proceeds to S220, otherwise, the process proceeds to S250.

At S220, a switch is biased in a linear mode to store electric energy in a magnetic component. In the FIG. 1 example, in a switching cycle, the control circuit 110 first provides the second voltage to the gate terminal of the first switch Q1, thus the first switch Q1 is in the linear mode. In addition, the control circuit 110 turns on the second switch Q2. The current $I_Q$ starts to increase, and electric energy is stored in the inductor L.

At S230, the switch is biased in a saturation mode to bleed power by the switch. In the FIG. 1 example, the control circuit 110 monitors the current $I_Q$, when the current $I_Q$ reaches a predetermined limit, such as when V3 is about 0.4V in an example, the control circuit 110 provides the third voltage to the gate terminal of the first switch Q1, thus the first switch Q1 is in the saturation mode. In addition, the control circuit 110 keeps turning on the second switch Q2. The current $I_Q$ keeps flowing through the first switch Q1, and the first switch Q1 has a relatively large source-drain voltage. The first switch Q1 consumes electric energy, and converts the electric energy to thermal energy.

At S240, the switch is bias in the off mode to release the stored energy in the magnetic component to the load. In the FIG. 1 example, after a predetermined time duration for the saturation mode, the control circuit 110 provides the first voltage to the gate terminal of the first switch Q1 to turn off the first switch Q1, and also turns off the second switch Q2. The stored electric energy in the inductor L is then transferred to the load 109 and the capacitor C2. In an example, the S220-S240 are repetitively executed in each switching cycle. When the dimming characteristic changes, the process returns to S210.

At S250, the switch is biased in the linear mode to store electric energy in a magnetic component. In the FIG. 1 example, in a switching cycle, the control circuit 110 first provides the second voltage to the gate terminal of the first switch Q1, thus the first switch Q1 is in the linear mode. In addition, the control circuit 110 turns on the second switch Q2. The current $I_Q$ starts to increase, and electric energy is stored in the inductor L.

At S260, the switch is bias in the off mode to release the stored energy in the magnetic component to the load. In the FIG. 1 example, the control circuit 110 monitors the current $I_Q$, when the current $I_Q$ reaches a predetermined limit, such as when V3 is about 0.4V in an example, the control circuit 110 provides the first voltage to the gate terminal of the first switch Q1 to turn off the first switch Q1. The control circuit 110 also turns off the second switch Q2. Then, the stored electric energy in the inductor L is transferred to the load 109 and the capacitor C2. In an example, the S250-S260 are repetitively executed in each switching cycle. When the dimming characteristic changes, the process returns to S210.

FIG. 3 shows a plot 300 of waveforms for voltages and current in the electronic system 100 according to an embodiment of the disclosure. The plot 300 includes a first waveform 310 for the gate voltage of the second switch Q2 (V1), a second waveform 320 for the source voltage of the first switch Q1 (V2), a third waveform 330 for the gate-source voltage of the first switch Q1 (V4), a fourth waveform 340 for the source-drain voltage of the first switch Q1 (V5), and a fifth waveform 350 for the current $I_Q$.

When the dimmer 102 is not in a deep dimming situation, the voltages and current in the electronic system 100 are illustrated by a first portion of the waveforms 310-350 in a first switching cycle (SWITCHING CYCLE 1). In an example, the first portion of the waveforms 310-350 repeats for each switching cycle when the dimmer 102 is not in the deep dimming situation. When the dimmer 102 is in a deep dimming situation, the voltages and current in the electronic system 100 are illustrated by a second portion of the waveforms 310-350 in a second switching cycle (SWITCHING CYCLE 2). In an example, the second portion of the waveforms 310-350 repeats for each switching cycle when the dimmer 102 is in the deep dimming situation.

Specifically, when the dimmer 102 is not in the deep dimming situation, in each switching cycle, the control circuit 110 first provides a relatively high gate voltage to the second switch Q2 as shown by 311, the second switch Q2 is turned on, and the source voltage of the first switch Q1 is low as shown by 321. In addition, the control circuit 110 provides a relatively high gate voltage to the first switch Q1 as shown by 331, thus the first switch Q1 is in the linear mode with a relatively small source-drain voltage (e.g., about zero) as shown by 341 and consumes little power. The current $I_Q$ starts to increase as shown by 351, and electric energy is stored in the inductor L.

Further, the control circuit 110 monitors the current $I_Q$, when the current $I_Q$ reaches a predetermined limit, such as when V3 is about 0.4V in an example, the control circuit 110 provides a relatively low gate voltage for the second switch Q2 as shown by 312, the second switch Q2 is turned off, and the source voltage of the first switch Q1 is high as shown by 322. In addition, the control circuit 110 provides a relatively low gate voltage to the first switch Q1 as shown by 332, thus the first switch Q1 is in the off mode to shut off the current $I_Q$ as shown by 352, and consumes little power. The stored electric energy in the inductor L is then transferred to the load 109 and the capacitor C2.

When the dimmer 102 is in the deep dimming situation, in each switching cycle, the control circuit 110 first provides a relatively high gate voltage to the second switch Q2 as shown by 313, the second switch Q2 is turned on, and the source voltage of the first switch Q1 is low as shown by 323. In addition, the control circuit 110 provides a relatively high gate voltage to the first switch Q1 as shown by 333, thus the first switch Q1 is in the linear mode with a relatively small source-drain voltage (e.g., about zero) as shown by 343 and consumes little power. The current $I_Q$ starts to increase as shown by 353, and electric energy is stored in the inductor L.

Further, the control circuit 110 monitors the current $I_Q$, when the current $I_Q$ reaches a predetermined limit, such as when V3 is about 0.4V in an example, the control circuit 110 maintains the relatively high gate voltage for the second switch Q2 as shown by 314, the second switch Q2 is still turned on, and the source voltage of the first switch Q1 is low as shown by 324. In addition, the control circuit 110 provides an intermediate gate voltage to the first switch Q1 as shown by 334, thus the first switch Q1 is in the saturation mode to conduct the current $I_Q$ as shown by 354 with a relatively large source-drain voltage as shown by 344. Thus, the first switch Q1 consumes power and converts electric energy to thermal energy.

Further, after a time duration, the control circuit 110 provides a relatively low gate voltage for the second switch Q2 as shown by 315, the second switch Q2 is turned off, and the source voltage of the first switch Q1 is high as shown by 325. In addition, the control circuit 110 provides a relatively low gate voltage to the first switch Q1 as shown by 335, thus the first switch Q1 is in the off mode to shut off the current $I_Q$ as shown by 355, and consumes little power. The stored electric energy in the inductor L is then transferred to the load 109 and the capacitor C2.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
an energy transfer circuitry configured to transfer energy from an energy source to a load;
control circuitry configured to detect a dimming characteristic in the energy source;
a first switch configured to be biased by the control circuitry to consume an energy from the energy source based on the dimming characteristic; and
a second switch coupled with the first switch in series together forming a current path to bleed the energy.

2. The apparatus of claim 1, wherein the control circuitry is further configured to draw additional energy from the energy source to the load for sustaining the dimming characteristic.

3. The apparatus of claim 2, wherein the control circuitry is further configured to switch on/off the first switch to draw the additional energy from the energy source to the load.

4. The apparatus of claim 3, wherein both the first and second switches are coupled in series with the energy transfer circuitry.

5. The apparatus of claim 4, wherein the first switch is a metal oxide semiconductor field effect transistor (MOSFET), and wherein the control circuitry is further configured to bias the MOSFET in a saturation mode to consume the energy on the MOSFET.

6. The apparatus of claim 5, wherein the control circuitry is further configured to bias the MOSFET in a linear mode to turn on the MOSFET to store the additional energy in the energy transfer circuitry in connection with the MOSFET.

7. The apparatus of claim 6, wherein the control circuitry is further configured to bias the MOSFET in an off mode to turn off the MOSFET to transfer the additional energy from the energy transfer circuitry to the load.

8. The apparatus of claim 7, wherein the control circuitry is further configured to output a first voltage for a gate terminal of the MOSFET to bias the MOSFET in the linear mode and to detect a current flowing through the MOSFET.

9. The apparatus of claim 8, wherein the control circuitry is further configured to output a second voltage for the gate terminal of the MOSFET to bias the MOSFET in the saturation mode in order to consume the energy when the current reaches a limit and to output a third voltage for the gate terminal of the MOSFET to turn off the MOSFET.

10. The apparatus of claim 2, wherein the control circuitry is further configured to switch on the first switch and the second switch to store the energy in the energy transfer circuitry and to switch on the first switch and switch off the second switch to charge a capacitor that stores energy for driving an integrated circuit (IC) chip including the control circuitry.

11. A method, comprising:
transferring energy from an energy source to a load by an energy transfer circuitry;
detecting a dimming characteristic in the energy source by a control circuitry;
biasing a first switch by the control circuitry to consume an energy from the energy source based on the dimming characteristic; and
bleeding the energy via a current path formed of a second switch coupled together with the first switch in series.

12. The method of claim 11, further comprising:
drawing additional energy from the energy source to the load for sustaining the dimming characteristic.

13. The method of claim 12, further comprising:
switching on/off the first switch to draw the additional energy from the energy source to the load.

14. The method of claim 13, further comprising:
coupling both the first and second switches in series with the energy transfer circuitry.

15. The method of claim 14, further comprising:
biasing the first switch, which is a metal oxide semiconductor field effect transistor (MOSFET), in a saturation mode to consume the energy on the MOSFET.

16. The method of claim 15, further comprising:
biasing the MOSFET in a linear mode to turn on the MOSFET to store the additional energy in the energy transfer circuitry in connection with the MOSFET.

17. The method of claim 16, further comprising:
biasing the MOSFET in an off mode to turn off the MOSFET to transfer the additional energy from the energy transfer circuitry to the load.

18. The method of claim 17, further comprising:
generating a first voltage for a gate terminal of the MOSFET to bias the MOSFET in the linear mode; and
detecting a current flowing through the MOSFET.

19. The method of claim 18, further comprising:
generating a second voltage for the gate terminal of the MOSFET to bias the MOSFET in the saturation mode in order to consume the energy when the current reaches a limit and to output a third voltage for the gate terminal of the MOSFET to turn off the MOSFET.

20. The method of claim 12, further comprising:
switching on the first switch and the second switch to store the energy in the energy transfer circuitry; and
switching on the first switch and switching off the second switch to charge a capacitor that stores energy for driving an integrated circuit (IC) chip including the control circuitry.

\* \* \* \* \*